United States Patent
Jungerman

(10) Patent No.: US 7,385,543 B2
(45) Date of Patent: Jun. 10, 2008

(54) SYSTEMS AND METHODS FOR ASYNCHRONOUS TRIGGERING OF AN ARBITRARY WAVEFORM GENERATOR

(75) Inventor: Roger L. Jungerman, Petaluma, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 27 days.

(21) Appl. No.: 11/471,120

(22) Filed: Jun. 19, 2006

(65) Prior Publication Data

US 2007/0290909 A1   Dec. 20, 2007

(51) Int. Cl.
*H03M 1/66* (2006.01)
*H03H 11/26* (2006.01)

(52) U.S. Cl. .................. 341/144; 327/106; 327/263; 327/266

(58) Field of Classification Search .......... 341/144, 341/147, 148; 327/105, 106, 107, 261, 263, 327/269, 276
See application file for complete search history.

(56) References Cited

U.S. PATENT DOCUMENTS

| | | | |
|---|---|---|---|
| 3,911,368 A | * 10/1975 | Tarczy-Hornoch | 327/237 |
| 6,084,930 A | * 7/2000 | Dinteman | 375/354 |
| 6,255,866 B1 | * 7/2001 | Wolaver et al. | 327/107 |
| 6,429,693 B1 | * 8/2002 | Staszewski et al. | 327/12 |
| 6,549,157 B1 | * 4/2003 | Tseng et al. | 341/147 |
| 6,664,832 B2 | * 12/2003 | Carley | 327/164 |
| 6,956,422 B2 | * 10/2005 | Reilly et al. | 327/261 |

FOREIGN PATENT DOCUMENTS

WO   WO 9804043 A   * 1/1998

* cited by examiner

*Primary Examiner*—Howard Williams

(57) ABSTRACT

A system and method for asynchronous triggering in a waveform generator comprising a DAC sample clock for generating DAC sample clock signal. The system includes a sequencer clock for generating a sequencer clock signal having a frequency of 1/N of the DAC sample clock. The system also includes an output data generator having I outputs to receive a waveform data stream of samples shifted into the data generator at the rate of the sequencer clock signal. An output multiplexer coupled receives samples from each of the I outputs of the output data generator and outputs the samples as a multiplexed data stream to the DAC. A triggering system receives an asynchronous trigger and splits the signal into an integer multiple M trigger inputs, each trigger input delayed by a DAC sample clock cycle. A shift controller determines a trigger position based on the trigger inputs and shifts a different waveform data stream into the data generator in accordance with the trigger position.

18 Claims, 6 Drawing Sheets

| SEQUENCER CLOCK CYCLE | Trigger Latch Word | Data Generator Output |
|---|---|---|
| 1 | 0000 | 1,1,1,1 |
| 2 | 0111 | 1,1,1,1 |
| 3 | 1111 | 1,7,7,7 |
| 4 | 1111 | 7,7,7,7 |
| 5 | 1111 | 7,7,7,7 |

*FIG. 4A*

SYSTEMS AND METHODS FOR ASYNCHRONOUS TRIGGERING OF AN ARBITRARY WAVEFORM GENERATOR

BACKGROUND OF THE INVENTION

1. Field of the Invention

The present invention relates to test and measurement systems, and more particularly to systems and methods for generating waveforms.

2. Description of Related Art

Arbitrary waveform generators (ARBs) are waveform generators that are capable of generating any arbitrary signal within the bandwidth of the generator. ARBs store digital descriptions of a signal in digital memory and play them out as analog signals. The digital descriptions are samples of data that are converted to analog signals using a digital-to-analog converter.

The amount of signal that can be stored in the memory space in a typical ARB is limited. For example, storing 10 G samples in a typical ARB generates only about 8 seconds of playtime. ARBs may include a sequencer to make more efficient use of the memory by playing the waveform repetitively in a loop.

Some ARBs use complex sequencers to control the playing of the waveform. Complex sequencers allow for waveforms to be played in nested loops to generate more sophisticated waveforms. One part of a signal may be a waveform stored in one part of memory to be played out in one loop, and another part of the signal may be a different waveform played out in a second loop nested in the first loop. When the nested loops are run by the sequencer, the varying output signal is generated as the combination of the waveforms.

The varying output signals are often produced in response to an externally applied trigger signal. It is desirable to have the output signal appear as soon as possible after the trigger is applied. However, the repeatability of this output latency for repeated trigger inputs is often more important than the latency itself.

To reduce the cost of memory and other digital electronics, most ARBs process the digital waveform data at a sub-multiple of the output sample rate. In many cases, the input trigger is latched with this lower speed clock. This gives rise to a larger output latency uncertainty, depending on when the trigger is received in relation to the lower rate clock.

Sequencers are typically implemented using programmable logic devices such as field programmable gate arrays (FPGAs). The FPGAs may employ a digital clock manager (DCM), which requires an uninterrupted clock signal. Since the trigger processing is performed in the FPGA at a lower clock rates, there is a relatively large uncertainty in when the trigger arrives. For example, a typical high-speed ARB might have a clock rate of 622 MHz. This is divided down (by 4) to 156 MHz for the main fabric of the FPGA. Hence, there is a trigger uncertainty of 1 FPGA clock period (6.4 ns) as to exactly when a trigger arrives before it is latched by the FPGA clock. With a complex sequencer, there are many actions that can be taken upon detection of a trigger, such as for example, starting a waveform or jumping to a new waveform.

One way to reduce the trigger uncertainty is to use a synchronous trigger. In the synchronous case, the trigger need only arrive some time during the FPGA clock period to achieve the desired triggered waveform. The user must be able to produce the synchronous trigger some time during the 6.4 ns window—with the expectation that the trigger will be acted upon on the next FPGA rising clock edge. Trigger uncertainties on the order of 1 ps (or less) can be achieved in this way. However many users cannot produce a synchronous trigger (which requires knowledge of the FPGA clock frequency and phase in the trigger generation circuitry. The user is also left with the relatively coarse granularity (6.4 ns) of the FPGA clock in setting when he wants the trigger to occur. Thus if the user is unable to employ the synchronous trigger, they are left with the relatively large FPGA clock (6.4 ns) uncertainty inherent with an asynchronous trigger.

Another way to reduce the asynchronous trigger uncertainty is to gate the sample clock. The sample clock (and FPGA clock) are disabled (gated) and the FPGA clock divider is reset. The waveform data is loaded into the FPGA. Using external high-speed logic (typically ECL) the clocks are gated on with a resolution of one Sample clock (1.6 ns in the case of a 622 MS/s DAC) and the predetermined waveform begins spooling out. This approach has the advantage of greatly reduced trigger latency uncertainty (4 times smaller, in this example) but suffers from several problems. First it can only be used to play a single waveform. Complex sequencing is not supported. Second more expensive and complex latch circuitry at the full sample rate is required. Finally, sequencer architectures that use complex FPGAs with DCMs do not support clock gating. Hence many of the features these FPGAs provide including advanced sequencing, reprogram ability, and smaller size without the time and expense of ASIC development are lost if clock gating is required.

There is a need for methods and systems for obtaining improved asynchronous timing resolution.

SUMMARY

In view of the above, examples of systems and methods for asynchronous triggering in a waveform generator include a DAC sample clock for generating DAC sample clock signal. The system also includes a sequencer clock for generating a sequencer clock signal having a frequency of 1/N of the DAC sample clock. An output data generator having I outputs receives a waveform data stream of samples shifted into the data generator at the rate of the sequencer clock signal. An output multiplexer receives samples from each of the I outputs of the output data generator and outputs the samples as a multiplexed data stream to the DAC. A triggering system receives an asynchronous trigger and splits the signal into an integer multiple M trigger inputs, each trigger input delayed by a DAC sample clock cycle. A shift controller determines a trigger position based on the trigger inputs and shifts a different waveform data stream into the data generator in accordance with the trigger position.

Various advantages, aspects and novel features of the present invention, as well as details of an illustrated embodiment thereof, will be more fully understood from the following description and drawings.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 4A is a table of example trigger phase input values and data generator output values for a series of sequencer clock cycles.

DETAILED DESCRIPTION

In the following description of preferred embodiments, reference is made to the accompanying drawings that form a part hereof, and which show, by way of illustration, specific embodiments in which the invention may be practiced. Other embodiments may be utilized and structural changes may be made without departing from the scope of the present invention.

Figure 1:
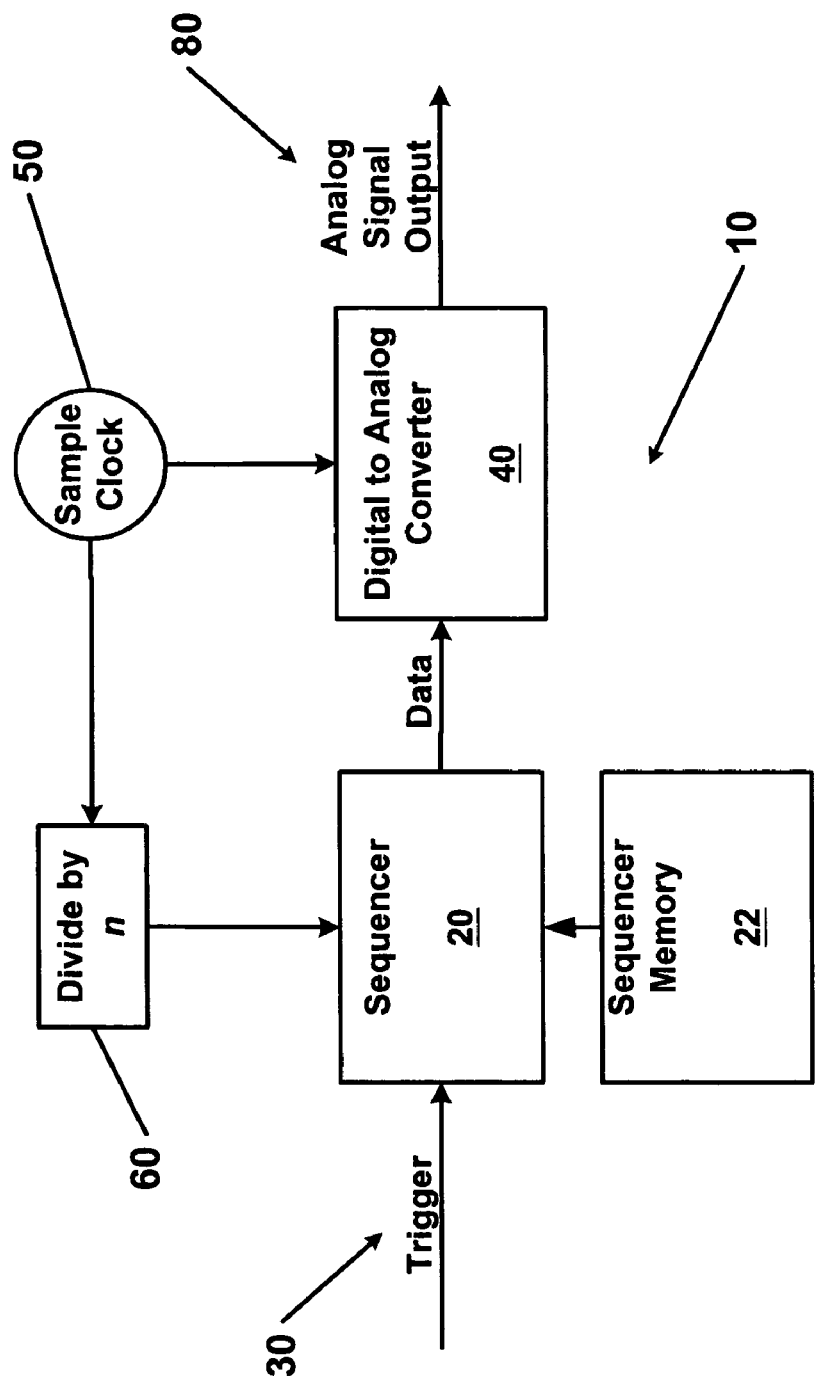
FIG. 1 is a block diagram of an example of an arbitrary waveform generator.

FIG. 1 is a block diagram of an example of a typical arbitrary waveform generator 10. The arbitrary waveform generator 10 includes a sequencer 20, sequencer memory 22, an analog-to-digital converter (DAC) 40, a sample clock 50 and a clock divider 60. The sequencer memory 22 contains digital waveform data that is streamed to the DAC 40 under control of the sequencer 20 to generate an analog signal output 80. The sequencer memory 22 may contain more than one waveform. When the sequencer 20 receives a trigger signal 30, the sequencer 20 switches to a different waveform in the sequencer memory 22.

The sample clock 50 generates the clock pulses used by the DAC 40 to generate the analog signal 80. The DAC 40 outputs an analog voltage at a level representative of the digital value at the input of the DAC 40. With each clock pulse from the sample clock 50, another digital waveform value in the waveform data is sampled creating a waveform at the analog signal output 80.

Figure 2:
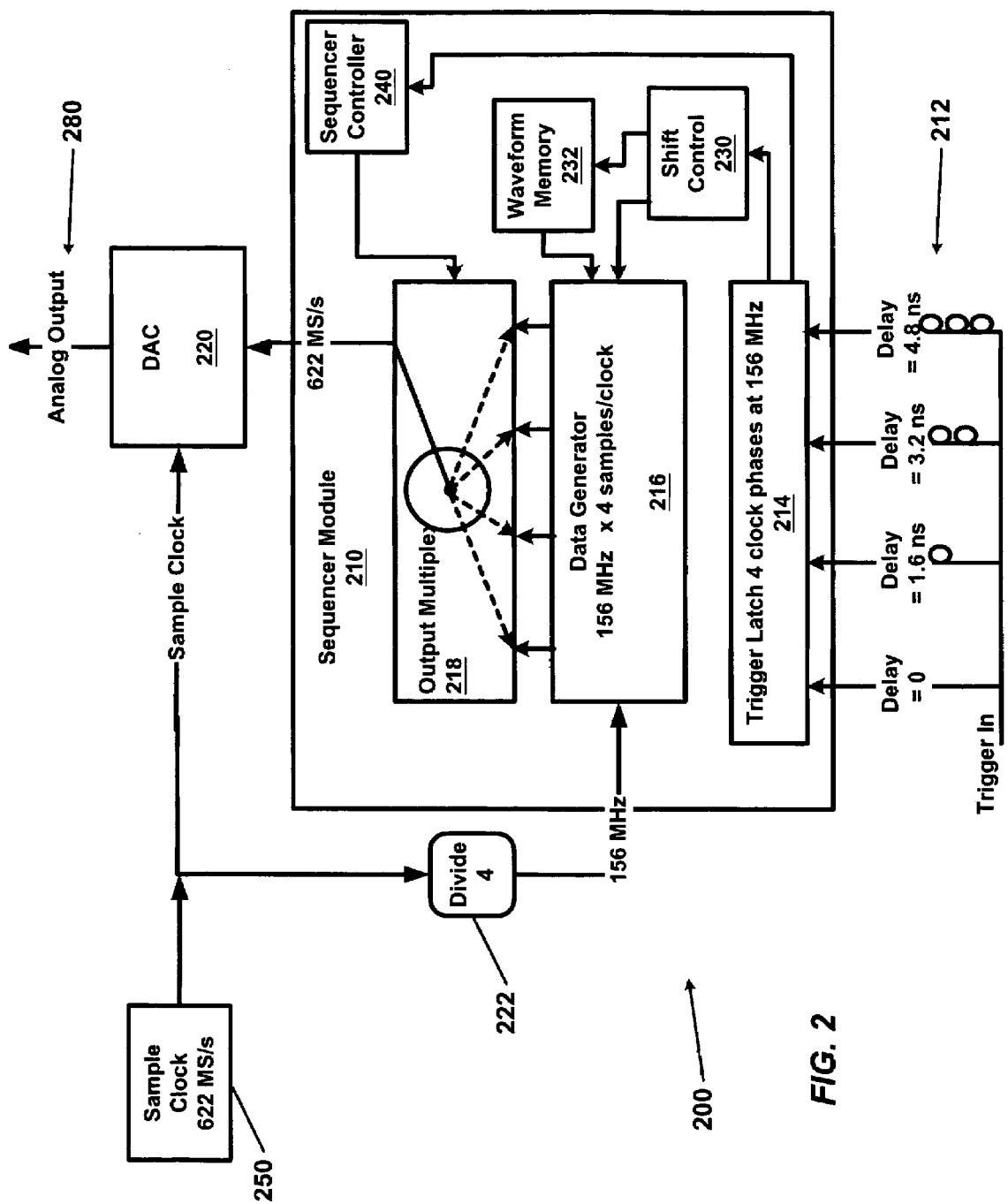
FIG. 2 is a block diagram of an example of an arbitrary waveform generator that implements an example of a system for asynchronous triggering consistent with the present invention.

FIG. 2 is an example of an arbitrary waveform generator 200 having an example of a system for asynchronous triggering consistent with the present invention. The arbitrary waveform generator 200 includes a sequencer module 210, a trigger system 212, a DAC 220, and a sample clock 250. A clock divider 222, a divide-by-four clock divider in the example shown in FIG. 2, divides the sample clock 250 for use by the sequencer module 210. In the example in FIG. 2, the sample clock 250 generates clock pulses at 622 MS/sec, which is used by the DAC 220 to clock conversion of the digital samples to the analog output 280. The divide-by-four clock divider 222 converts the sample clock to a 156 MHz clock signal for use by the sequencer module 210.

The sequencer module 210 includes a trigger latch 214, a data generator 216, an output multiplexer 218, a shift controller 230, a waveform memory 232, and a sequencer controller 240. The trigger latch 214 receives a set of trigger signals from the trigger system 212 in four phases and latches the trigger signals using the 156 MHz clock. The data generator 216 may include the waveform data, or it may receive waveform data from a waveform memory 232. The waveform memory 232 may include more than one stream of data samples, each stream representing a different waveform. The shift controller 230 determines a trigger position as described below and signals the data generator 216 to shift in samples from the waveform memory 232 in accordance with the trigger position. The data generator 216 outputs the waveform data to the output multiplexer 218 in four data streams. The sequencer controller 240 controls operation of the sequencer module 210.

In the example of FIG. 2, the DAC 220 receives the data from the output multiplexer 218 at 622 MSamples/s despite using a clock with a maximum rate of about ~156 MS/s. This is accomplished by multiplexing the four data streams up to a rate of 622 MS/s. The multiplexed data is sent to the DAC 220. The output multiplexer 218 uses a digital clock manager (DCM) to provide clock functions that enable the multiplexing function. Operation of a DCM to enable operation of a multiplexer is well known in the art and therefore not described in further detail.

The triggering system 212 generates four trigger signal inputs to the trigger latch 214. In normal operation, the four trigger signal inputs may be used to trigger multiple functions in the arbitrary waveform generator. The four trigger signal inputs are latched in to the trigger latch 214 with the 156 MHz clock. In one example, a double data rate (DDR) register and a doubled clock are used by the triggering system 212 to generate four phases of the 156 MHz clock. The four phases include a first trigger edge aligned with the original trigger input (delay=0), a second phase with a delay of 1.6 ns from the trigger, a third phase with a delay of 3.2 ns, and a fourth phase at 4.8 ns.

At any given time, the four phases form a four-bit word (i.e. the trigger latch word) at the trigger latch 214. As a waveform is being generated, the trigger latch word is 0000. The samples of the waveform are shifted into the data generator 216 and multiplexed sequentially by the output multiplexer 218 to output the stream of samples in the proper sequence so that the DAC 220 outputs the proper analog waveform. When the trigger latch 214 latches in the four trigger bits using the 156 MHz clock, a new waveform may be shifted into the data generator 218. The samples for the new waveform are shifted in according to which trigger bits are set in the trigger latch word. A trigger edge that switches to a new waveform may be defined by one of the four trigger bits. The position of the trigger edge is determined by looking at which of the four trigger bits the 0→1 rising transition occurs. The parallel data out of the data generator 216 is then shifted to time shift the output data from 0-3 sample clock cycles, to achieve a vernier in the trigger resolution. The four phase trigger input advantageously reduces the timing resolution of the triggering latency from 6.4 ns down to 1.6 ns.

One further advantage of the system shown in FIG. 2 is that it can achieve 1.6 ns asynchronous timing resolution while maintaining more sophisticated sequencing functions (such as jump triggers or dynamic sequencing triggers) in the arbitrary waveform generator.

In the example shown in FIG. 2, the trigger is split and delayed by integer multiples of the DAC sample clock to form multiple triggers. These triggers are latched into four parallel latch inputs, clocked on the rising edge of the sequencer module 210 clock. By analyzing the trigger latch word, the desired position of the four samples from the output generator 216 to the output multiplexer 218 can be determined. Each of the four data streams is at ¼ of the final data rate. When combined (interleaved) they represent the full composite data stream. The sequencer controller 240 analyzes the trigger latch word to determine which bit to use as the trigger position. The sequencer controller 240 then switches the multiplexer 218 to output from the output stream according to the selected trigger position.

One of ordinary skill in the art will appreciate that the system in FIG. 2 is just one example of a system for asynchronous triggering in an arbitrary waveform generator. The sample clock in FIG. 2 is 622 MSamples/s and it is divided by four to provide a 156 MHz clock for the sequencer module, but one of ordinary skill in the art will appreciate that these are merely examples and any clock frequency and/or divider may be used. The system in FIG. 2 may also be extended to additional clock phases (such as 8 or 16 phases) to achieve 800 or 400 ps of asynchronous timing resolution externally. In addition, the data multiplexing to the DAC 220 need not be performed entirely in the sequencer module 210. With knowledge of the asynchronous timing to 1/N of the sequencer clock cycle, the sequencer module 210 can shift the data provided to the output multiplexer 218 by 0 to N-1 samples of the ultimate high-speed DAC sample rate. The asynchronous timing information can come from multiple time-skewed inputs as shown. Furthermore, other techniques can be used to obtain the timing information, such as for example, multiple time-skewed latching clocks in the sequencer module 210 or in other external high-speed latching circuitry (clocked at a higher clock rate such as the DAC sample clock rate), with the timing information fed to the sequencer module 210.

The sequencer module 210 in FIG. 2 may be implemented on a programmable logic device such as a field programmable gate array (FPGA).

Figure 3:
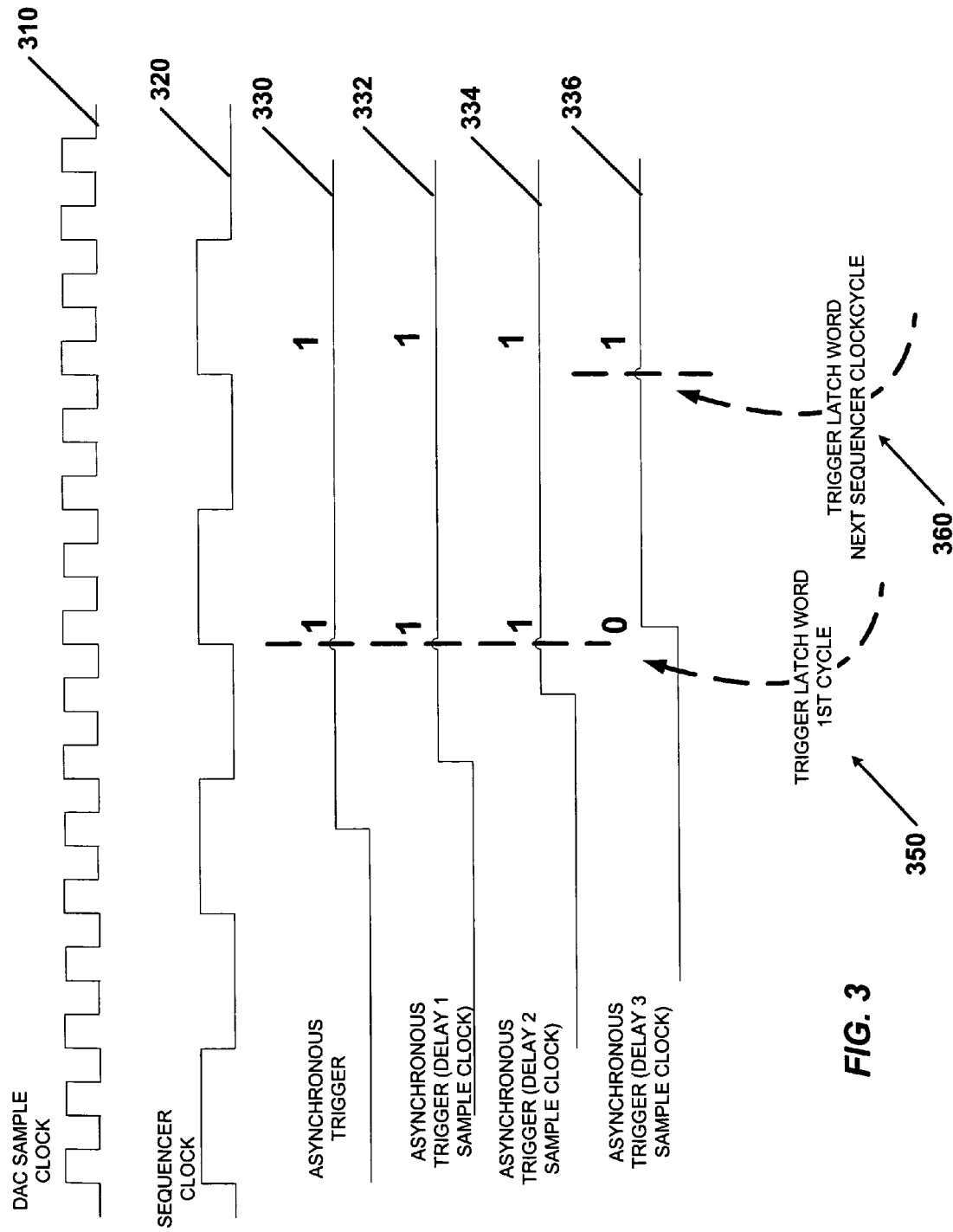
FIG. 3 is a timing diagram illustrating operation of an example of systems and method for asynchronous triggering consistent with the present invention.

FIG. 3 is a timing diagram illustrating use of the trigger latch word. The timing diagram uses the DAC sample clock 310 as a base time line with a 622 MSamples/s rate. The sequencer clock signal 320 is below the DAC sample clock 310 generated by the divide-by-four clock divider 222 to generate the 156 MHz signal. An example set of trigger signals are then set forth below the sequencer clock signal 320. The trigger signals are generated by a single asynchronous trigger input 330, which means that the signals may begin at any time. The asynchronous trigger input 330 is used as the delay=0 trigger input as shown in FIG. 2. A one sample clock delay trigger input 332 is generated one sample clock cycle after the asynchronous trigger input 330. A two sample clock delay trigger input 334 is generated two sample clock cycles after the asynchronous input 330. A three sample clock delay trigger input 336 is generated three sample clock cycles after the asynchronous input 330.

A first trigger latch word 350 is formed at the first rising edge of the sequencer clock signal 320 after the asynchronous trigger input 330. In the timing diagram shown in FIG. 3, the first trigger latch word 350 is "1110," which represents the level of the asynchronous trigger 330 (1), the level of the one sample clock delay trigger input 332 (1), the level of the two sample clock delay trigger input 334 (1), and the level of the three sample clock delay trigger input 336 (0). In the next sequencer clock signal 320, the second trigger latch word 360 is analyzed to determine the trigger position. In the example shown in FIG. 3, the second trigger latch word 360 is "1111." By comparing the first trigger latch word 350 with the second trigger latch word 360, the trigger position is determined to be the three sample clock delay trigger input 336.

Figure 4B:
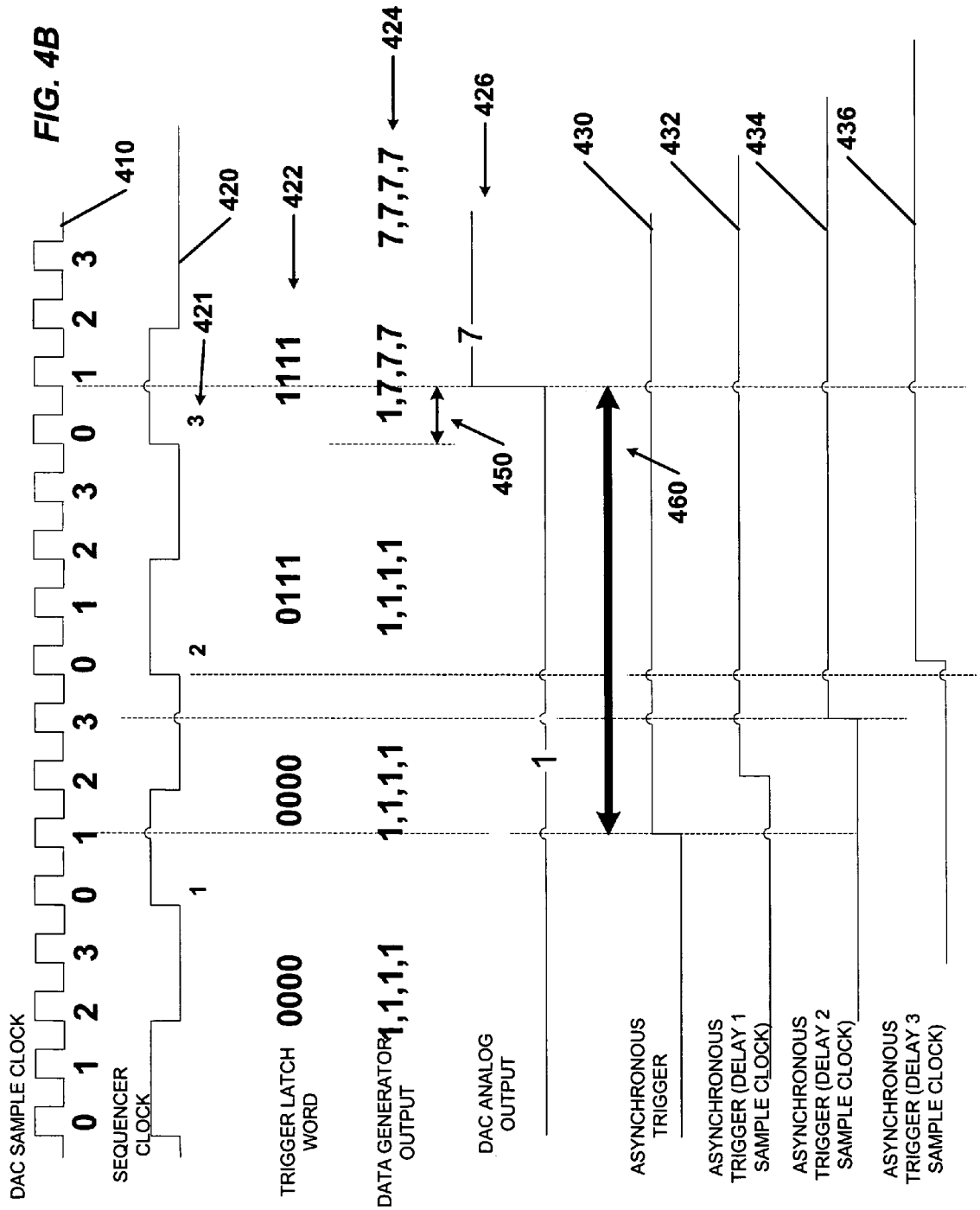
FIG. 4B is a more detailed timing diagram illustrating operation of an example of systems and method for asynchronous triggering consistent with the present invention.

FIGS. 4A and 4B illustrate operation of an example of a system for asynchronous triggering consistent with the present invention taking into consideration the analog output. The example illustrated in FIGS. 4A and 4B assumes that the arbitrary waveform generator is being used to generate an analog output that is a step that occurs a repeatable time after the asynchronous trigger event. There is typically some latency in the digital logic (e.g. trigger latch and data multiplexer). For many applications, so long as the delay of the analog output from the DAC is a nearly fixed time delay after the asynchronous trigger event reliable user system operation is achieved. Basically, a system for asynchronous triggering advantageously reduces the jitter of the output after the trigger event—rather than the total delay or latency.

For the sake of simplicity in FIGS. 4A and 4B, it is assumed that the latency in the digital logic is 1 sequencer clock cycle (though in practice, the delays will typically be longer). The example illustrated in FIGS. 4A and 4B assumes the start of a waveform at the analog signal output that transitions from a level '1' to a level '7' a fixed latency after the asynchronous trigger. The levels '1' and '7' in this example are numbers arbitrarily chosen to indicate a change of voltage levels in a step function. FIG. 4A is a table showing the data output from each of the four data streams of the sequencer data generator to the output multiplexer as a function of the trigger latch word. FIG. 4B provides further description using a timing diagram.

In FIG. 4A, the trigger latch word at the rising edge of the first sequencer clock cycle is 0000, which indicates that no trigger signal has been received. The data generator output is at '1' at each of the four data streams. At the rising edge of the second sequencer clock cycle, the trigger latch word is 0111 indicating that an asynchronous trigger input had been received. The '1' in the least significant bit position indicates that the trigger had been received. The '1' in the second least significant bit position indicates that the trigger had been received after at least a one DAC sample clock delay had elapsed. The '1' in the third least significant bit of the trigger latch word indicates that the trigger had been received after a two DAC sample clock delay. The '0' in the most significant bit of the trigger latch word indicates that the rising edge of the second sequencer clock cycle occurred before the third DAC sample clock delay. Even though the trigger input had been received, the data generator output for each of the four data streams remains at '1' due to the one sequencer clock cycle delay.

At the rising edge of the third sequencer clock cycle, the trigger latch word is '1111' indicating that all four phases of the trigger signal had been latched in. The data generator output for the three data streams corresponding to the first, second and third bits that had switched to the '1' level in the previous sequencer clock cycle is now at '7.' At the rising edge of the fourth sequencer clock cycle, all of the trigger latch word bits are still at '1111' and the data generator output is '7777.' By comparing the trigger latch word at the second sequencer clock cycle with the trigger latch word at the third sequencer, it is clear that the '0' to '1' transition occurred at the third trigger bit.

FIG. 4B is a timing diagram illustrating the example used in the table of FIG. 4A. FIG. 4B includes a DAC sample clock 410 with its cycles enumerated from 0 to 3 repeated across the diagram, and a sequencer clock 420 with numbers at 421 corresponding with the sequencer clock cycle column in the table in FIG. 4A. The cycle numbers (1, 2, and 3) under the DAC sample clock represent the DAC sample clock count in each cycle of the sequencer clock 420. Under the sequencer clock 420, a trigger latch word sequence 422 shows the trigger latch word value at each cycle of the sequencer clock 420. Under the trigger latch word sequence 422, a data generator output sequence 424 shows the sample values ready to be output to the output multiplexer in each of the four output data streams. Under the data generator output sequence 424, a DAC analog output diagram 426 shows where the level of the output changes from '1' to '7' relative to the sequencer clock 420. Under the DAC analog output diagram 426 are an asynchronous trigger input 430, a first sample clock delay trigger 432, a second sample clock delay trigger 434, and a third sample clock delay trigger 436.

FIG. 4B shows the rising transition of the asynchronous trigger 430 within the first cycle (no. 1) of the sequencer clock 420. The analog output 426 at this point is at level '1.' The first sample clock delay trigger 432 rises one DAC clock cycle time later. The second sample clock delay trigger 434 rises one DAC clock cycle time after the first sample clock delay trigger 432. The third sample clock delay trigger 436 rises one DAC clock cycle time after the second sample clock delay trigger 434.

When the sequencer clock 420 transitions from cycle 1 to cycle 2, the trigger latch 214 (shown in FIG. 2) registers the trigger latch word 422 corresponding to the sample clock delay triggers 430, 432, 434, 436 that have been asserted. As shown in FIG. 4B, the bits in the trigger latch word 422 are set to 1 to correspond with the asynchronous trigger 430, and the first and second sample clock delay triggers 430, 432, 434. The third sample clock delay trigger 436 rises just after the rising edge of cycle no. 2 of the sequencer clock 420. Accordingly, the trigger latch word 422 value is 0111.

Knowing the trigger latch word 422 allows for the determination of the actual delay between the asynchronous trigger 430 and the analog output 426 with a resolution of one DAC clock cycle. Because the delays between each of the sample clock delay triggers is one DAC clock cycle, the total delay between the asynchronous trigger 430 and the analog output 426 is the digital logic delay (i.e. presumed for purposes of illustration in this case to be one sequencer clock cycle) plus the number of trigger delays * the DAC sample clock cycle time. In the example shown in FIG. 4B, the delay between the asynchronous trigger 430 and the analog output 426 is one digital logic delay time of 6.41 ns plus the number of ones in the trigger latch word 422, which in this case is three, * the DAC sample clock cycle time of 1.6 ns. with a resolution of one DAC sample clock cycle time. In FIG. 4B, the delay between the asynchronous trigger 430 and the analog output 426 is shown at 460 and equals about seven DAC sample clock cycles plus less than one more.

One of ordinary skill in the art will appreciate that the asynchronous trigger 430 is exactly that-asynchronous. As such, it may arise anywhere within a sequencer clock cycle. The use of the trigger latch (at 214 in FIG. 2) and multiple delay triggers (at 430, 432, 434, 436 in FIG. 4B) provides a vernier permitting finer resolution of the trigger delay-to within one DAC sample cycle as opposed to within one sequencer clock cycle.

Figure 5:
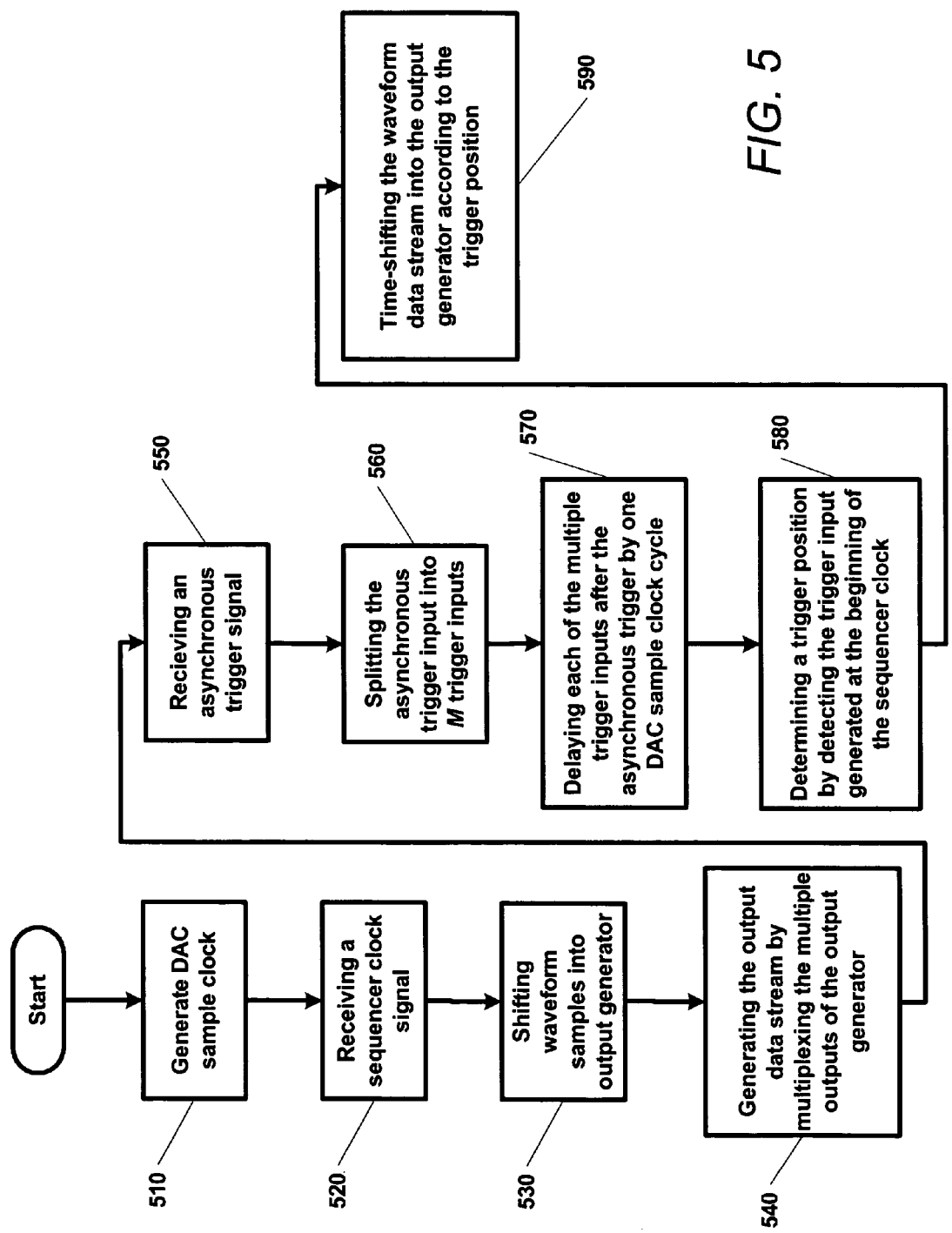
FIG. 5 is a flowchart illustrating an example of a method consistent with the present invention.

FIG. 5 is a flowchart illustrating operation of an example of a method consistent with the present invention. At step 510 of the method, a DAC sample clock is generated. In the example described with reference to FIG. 2, the DAC sample clock frequency is 622 Msamples/sec. At step 520, a sequencer clock signal is received, the sequencer clock signal having a frequency of the DAC sample clock frequency divided by an integer number N. In the example described with reference to FIG. 2, the sequencer clock frequency is ¼ the frequency of the DAC sample clock. At step 530, samples of a current waveform are shifted into the output generator. The shift being triggered by the signal having a resolution equal to the DAC sample clock period. At step 540, the output data stream is generated by multiplexing the output streams from the output generator. In the example described above with reference to FIG. 2, four outputs of the output generator are multiplexed to yield a stream of data to be sampled at the DAC sample clock frequency. At step 550, an asynchronous trigger signal is received. The asynchronous trigger signal may be received at any time. At step 560, the asynchronous trigger signal is split into M trigger inputs. In the example described above with reference to FIG. 2, the asynchronous trigger signal is split into four trigger inputs. At step 570, each trigger input is delayed by one DAC sample clock cycle. That is, the first one of the trigger inputs after the asynchronous trigger signal is delayed by one DAC sample clock cycle after the asynchronous trigger signal. The next trigger input is delayed one DAC sample clock cycle after the first trigger input. The next trigger input is delayed one DAC sample clock cycle after the second trigger input. Each subsequent trigger input is delayed one DAC sample clock cycle after the previous trigger input until the Mth trigger input has been generated. At step 580, the trigger position is determined by detecting the trigger input generated last before the next transition of the sequencer clock. At step 590, the data stream is time-shifted through the output generator to match the trigger position.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed:

1. A method for asynchronous triggering in a waveform generator, the method comprising:
   generating a digital to analog converter (DAC) sample clock;
   receiving a sequencer clock having a frequency of the DAC sample clock divided by an integer number N;
   shifting a waveform data stream into an output data generator having an integer number I outputs each sequencer clock cycle;
   multiplexing the I outputs of the output data generator into a single data stream and outputting the data stream to a DAC for conversion to an analog signal;
   receiving an asynchronous trigger input signal;
   splitting the asynchronous trigger input signal to generate a number M trigger inputs and delaying each of the trigger inputs after the asynchronous trigger input by:
      starting with the first of the M trigger inputs, sequentially delaying each trigger input by an integer multiple of the DAC sample clock relative to the previous trigger input;
   determining a trigger position by detecting the trigger input that is generated at the beginning of a next sequencer clock cycle; and time-shifting the waveform data stream into the I-output data generator to output samples from an output corresponding to the trigger position.

2. The method of claim 1 where I=M=N.

3. The method of claim 2 where N=4.

4. The method of claim 1 further comprising:
latching a trigger latch word in a register at the first edge transition of the sequencer clock cycle following the edge transition of the asynchronous trigger.

5. The method of claim 4 further comprising:
analyzing the trigger latch word to determine the integer time-shifting needed to output the samples from the output.

6. An arbitrary waveform generator using the method of claim 1 to perform asynchronous triggering.

7. A system for asynchronous triggering in a waveform generator comprising:
a DAC sample clock for generating DAC sample clock signal;
a sequencer clock for generating a sequencer clock signal having a frequency of 1/N of the DAC sample clock;
an output data generator having I outputs to receive a waveform data stream of samples shifted into the data generator at the rate of the sequencer clock signal;
an output multiplexer coupled to receive samples from each of the I outputs of the output data generator and to output the samples as a multiplexed data stream to the DAC;
a triggering system to receive an asynchronous trigger and split the signal into an integer multiple M trigger inputs, each trigger input delayed by a DAC sample clock cycle; and
a shift controller to determine a trigger position based on the trigger inputs and to shift a different waveform data stream into the data generator in accordance with the trigger position.

8. The system of claim 7 where I=M=N.

9. The system of claim 8 where N=4.

10. The system of claim 7 further comprising:
a trigger latch to receive the M trigger inputs and to latch the M trigger input states at the next transition of the sequencer clock.

11. The system of claim 7 where the triggering system uses a double data rate register (DDR) and a doubled clock to split the asynchronous trigger and to delay the trigger inputs.

12. The system of claim 7 where the output data generator includes waveform memory containing waveform sample streams representing at least one analog signal waveform.

13. The system of claim 7 further comprising a waveform memory system containing waveform sample streams representing at least one analog signal waveform.

14. An asynchronous triggering system for use in a waveform generator comprising:
an asynchronous trigger input to receive an asynchronous signal;
digital logic to split the asynchronous signal into an integer multiple M trigger inputs, and to output each trigger signal sequentially, each trigger signal delayed by a delay time after the previous trigger signal; and
a tripper latch to receive the M trigger inputs and to latch a corresponding M tripper input states at a next transition of a sequencer clock.

15. A field programmable logic array device comprising circuitry for implementing the asynchronous triggering system of claim 14.

16. A method for asynchronous triggering comprising:
receiving an asynchronous trigger input signal;
splitting the asynchronous trigger input signal to generate a number M trigger inputs and delaying each of the trigger inputs after the asynchronous trigger input by:
starting with the first of the M trigger inputs, sequentially delaying each trigger input by a delay relative to the previous trigger input; and
receiving the M trigger inputs at a register and latching a trigger latch word in the register at a first edge transition of a sequencer clock cycle following an edge transition of the asynchronous trigger input signal, the trigger latch word comprising M trigger input states.

17. The method of claim 16 further comprising:
analyzing the trigger latch word to determine a trigger position within the sequencer clock cycle at which to shift in the new waveform.

18. The method of claim 16 further comprising:
outputting the trigger latch word to a waveform generator having a sequencer clock, the trigger latch word indicative of a trigger position that may be used by the waveform generator to switch to another waveform, the switching occurring with a resolution that is less than a resolution of the sequencer clock cycle.

* * * * *

UNITED STATES PATENT AND TRADEMARK OFFICE
CERTIFICATE OF CORRECTION

| | | |
|---|---|---|
| PATENT NO. | : 7,385,543 B2 | Page 1 of 1 |
| APPLICATION NO. | : 11/471120 | |
| DATED | : June 10, 2008 | |
| INVENTOR(S) | : Jungerman | |

It is certified that error appears in the above-identified patent and that said Letters Patent is hereby corrected as shown below:

In column 10, line 15, in Claim 14, delete "tripper" and insert -- trigger --, therefor.

In column 10, line 16, in Claim 14, delete "tripper" and insert -- trigger --, therefor.

Signed and Sealed this

Second Day of September, 2008

JON W. DUDAS
*Director of the United States Patent and Trademark Office*